United States Patent
Dungworth et al.

(10) Patent No.: US 11,044,906 B2
(45) Date of Patent: Jun. 29, 2021

(54) POLYMERIC COATING COMPOSITIONS

(71) Applicant: Croda International Plc, East Yorkshire (GB)

(72) Inventors: Howard Dungworth, Elland (GB); James Wickson, York (GB); Kathryn Knight, Selby (GB); James Flavell, Selby (GB)

(73) Assignee: Croda International Plc

( * ) Notice: Subject to any disclaimer, the term of this patent is extended or adjusted under 35 U.S.C. 154(b) by 0 days.

(21) Appl. No.: 16/301,522

(22) PCT Filed: May 25, 2017

(86) PCT No.: PCT/GB2017/051480
§ 371 (c)(1),
(2) Date: Nov. 14, 2018

(87) PCT Pub. No.: WO2017/203261
PCT Pub. Date: Nov. 30, 2017

(65) Prior Publication Data
US 2019/0216080 A1    Jul. 18, 2019

(30) Foreign Application Priority Data
May 25, 2016    (GB) .................................. 1609160

(51) Int. Cl.
*A01N 25/04*    (2006.01)
*A01N 25/26*    (2006.01)
*A01N 25/10*    (2006.01)
*A01C 1/06*    (2006.01)

(52) U.S. Cl.
CPC ............. *A01N 25/04* (2013.01); *A01N 25/10* (2013.01); *A01N 25/26* (2013.01)

(58) Field of Classification Search
CPC ........ A01N 25/04; A01N 25/26; A01N 25/10; A01C 1/06
See application file for complete search history.

(56) References Cited

U.S. PATENT DOCUMENTS

| | | | |
|---|---|---|---|
| 3,707,807 A | 1/1973 | Graves | |
| 4,272,417 A | 6/1981 | Barke et al. | |
| 5,106,648 A | 4/1992 | Williams | |
| 6,329,319 B1 | 12/2001 | Puglisi et al. | |
| 6,620,878 B1 * | 9/2003 | Lyons | C09D 133/064 524/515 |
| 7,989,391 B2 | 8/2011 | Tang et al. | |
| 8,273,684 B2 | 9/2012 | Tang et al. | |
| 2007/0298965 A1 | 12/2007 | Schneider et al. | |
| 2008/0103044 A1 | 5/2008 | Tang et al. | |
| 2011/0306727 A1 | 12/2011 | Grablowitz et al. | |
| 2012/0088806 A1 | 4/2012 | Arthur et al. | |
| 2012/0277099 A1 | 11/2012 | Olson et al. | |
| 2014/0100111 A1 | 4/2014 | Schultz et al. | |
| 2015/0119246 A1 | 4/2015 | Jelesko et al. | |
| 2016/0345575 A1 * | 12/2016 | Wiand | C09D 109/08 |

FOREIGN PATENT DOCUMENTS

| | | |
|---|---|---|
| CA | 2829711 A1 | 10/2012 |
| EP | 0697422 A1 | 2/1996 |
| EP | 0862856 A1 | 9/1998 |
| EP | 1078563 B1 | 11/2005 |
| JP | 2001139870 A | 5/2001 |
| JP | 2007522174 A | 8/2007 |
| JP | 2011093932 A | 5/2011 |
| JP | 2014511916 A | 5/2014 |
| WO | 9400508 A1 | 1/1994 |
| WO | 9616930 A1 | 6/1996 |
| WO | 2005011993 A2 | 2/2005 |
| WO | 2010129662 A1 | 11/2010 |
| WO | 2011014720 A1 | 2/2011 |
| WO | 2015193239 A1 | 12/2015 |

OTHER PUBLICATIONS

International Search Report and Written Opinion for International Application No. PCT/GB2017/051480, dated Jul. 11, 2017—15 pages.
Roth, J.-K., "Design of Seed Coatings—Connecting Polymer Properties with Overall Performance Through Method Development", Master of Science Thesis, Chalmers University of Technology, Gothenburg, Sweden, 2014—46 pages.
Notice of Reasons for Refusal for Japanese Application No. 2018-561241, dated Nov. 10, 2020, with translation, 10 pages.
Notification of Reason for Refusal for Korean Application No. 10-2016-7037045, dated Mar. 16, 2021, with translation, 14 pages.

* cited by examiner

*Primary Examiner* — Mina Haghighatian
(74) *Attorney, Agent, or Firm* — RatnerPrestia

(57) ABSTRACT

An emulsion polymer system suitable for use in agrochemical formulations for coating seeds. The emulsion polymer system comprises a core polymer and stabiliser polymer where the core is a polymer with a low glass transition temperature (−100° C. to 10° C.) and the stabiliser has a high glass transition temperature (30° C. to 300° C.). There is also provided a method of making the core-stabiliser system. The core-stabiliser system is suitable for seed coating formulations provided dust off, germination, and good flow.

15 Claims, No Drawings

POLYMERIC COATING COMPOSITIONS

CROSS REFERENCE TO RELATED APPLICATIONS

This application is the National Stage filing of International Appln. No. PCT/GB2017/051480, filed May 25, 2017, and claims priority of GB Application No. 1609160.5, filed May 25, 2016, the entirety of which applications is incorporated herein by reference for all purposes.

The present invention relates to polymeric based coating composition and formulation for use in agricultural applications, and polymers for use in said coating compositions. The present invention also includes methods of treating crops with such formulations.

Commercial agricultural practices have come to use coating compositions increasingly over the last few years. Typically these coating compositions are used to bind various components, such as agrochemical actives, to the surface of a plant or seed.

The purpose of the coating compositions may include a number of functions including adhering an agrochemical active to the seed or plant surface, adhering a pigment to a seed or plant surface, or simply for adding volume or bulk to a seed. In all cases the coating is desirably easy to apply, remains fixed to the seed or plant surface, may be permeable to water and/or air, resistant to dust off, and forms uniform coatings.

The present invention seeks to provide a polymeric composition suitable for use as coating composition in agrochemical formulations, where said dispersants are able to overcome the above described problems. Additionally, the present invention seeks to provide coatings which have desired properties of adhesion, permeability, water retention etc. when applied to the seed or plant surface.

The present invention also provides for the use of the coating composition in agrochemical coating compositions formed by dilution of the concentrate emulsion. The present invention also seeks to provide the use of dilute coating composition for treatment of crops and seeds.

According to a first aspect of the present invention there is provided an emulsion polymer system for agrochemical use comprising a core-stabiliser copolymer, said copolymer comprising;
  a stabiliser polymer comprising acid based and hydrophobe monomers having a weight/number ratio of said acid to hydrophobe of 10-90:90-10, a $T_g$ in the range from 30° C. to 300° C., and a molecular weight less than 100,000; and
  a core polymer having a $T_g$ in the range from −100° C. to 10° C.

According to a second aspect of the present invention there is provided a method of preparing an emulsion polymer system for agrochemical use according to the first aspect, said method comprising mixing;
  a stabiliser polymer comprising acid based and hydrophobe monomers having a weight/number ratio of said acid to hydrophobe of 10-90:90-10, a $T_g$ in the range from 30° C. to 300° C., and a molecular weight less than 100,000; and
  monomer suitable for forming a core polymer having a $T_g$ in the range from −100° C. to 10° C.

According to a third aspect of the present invention there is provided an emulsion polymer system for agrochemical use comprising:
  i) stabiliser polymer formed from acrylic acid monomer and vinyl aromatic monomer; and
  ii) core polymer formed from vinyl aromatic monomer and alkyl ester of acrylic or alkyl acrylic acid monomer.

According to a fourth aspect of the present invention there is provided an emulsion polymer system as defined in the first or third aspect for use as a film former, which also optionally comprises at least one of an agrochemical active, micronutrient, dyes, pigment, and/or bulk filler, for use as a film former for coating vegetation, plants, and/or seeds.

According to a fifth aspect of the present invention there is provided a diluted emulsion polymer system according to the first or third aspect comprising in the range from 0.0001 to 10 wt. % in total of the core-stabiliser copolymers.

According to a sixth aspect of the present invention there is provided a method of coating seeds by applying an agrochemical composition comprising an agrochemical compound or substance and a core-stabiliser copolymer as defined in the first or third aspect.

According to an seventh aspect of the present invention there is provided a coated seed, where the coating comprises a stabiliser polymer having a $T_g$ in the range from 30° C. to 300° C. and molecular weight less than 100,000, and a core polymer having a $T_g$ in the range −100° C. to 10° C.

According to an eighth aspect of the present invention there is provided a method of treating vegetation, plants, and/or seeds to provide micronutrients, actives, dyes, pigments, and/or bulking agents, by applying to said vegetation or seeds a coating formulation including an emulsion polymer of the first or third aspect.

It has been found that emulsion polymer systems comprising a combination of stabiliser polymer and soft core polymer as defined herein provide for coating compositions when used in agrochemical formulations are able to provide seed coatings having desired properties, and are able to allow passage of water from the surroundings to the vegetation/plants/seeds thereby coated. Additionally, it has been found that the seed coating of the present invention does not suppress or hinder release of an agrochemical active comprised in said coating.

As used herein, the terms 'for example' 'for instance' 'such as' or 'including' are meant to introduce examples that further clarify more general subject matter. Unless otherwise specified, these examples are provided only as an aid for understanding the applications illustrated in the present disclosure, and are not meant to be limiting in any fashion.

It will be understood that, when describing the number of carbon atoms in a substituent group (e.g. '$C_1$ to $C_6$ alkyl'), the number refers to the total number of carbon atoms present in the substituent group, including any present in any branched groups. Additionally, when describing the number of carbon atoms in, for example fatty acids, this refers to the total number of carbon atoms including the one at the carboxylic acid, and any present in any branch groups.

The term 'seed' as used herein refers in particular to the ripened ovule of gymnosperms and angiosperms, which contains an embryo surrounded by a protective cover. In particular, the term covers cereal kernels. The protective cover can comprise the seed coat (testa). Some seeds comprise a pericarp or fruit coat around the seed coat. In particular when this layer is closely adhered to the seed, as in cereal kernels, it is in some cases referred to as a caryopsis or an achene. As used herein, the term 'seed coat' includes a caryopsis or an achene. In practical terms, the term 'seed' includes but is not restricted to anything that can be planted in agriculture to produce plants, including pelleted seeds, true seeds, plant seedlings, rootstock, plant cuttings and plant parts such as a tuber or bulb.

The term 'coating' as used herein refers broadly to applying material to a surface of a seed, for instance as a layer of a material around a seed. Coating includes film coating, pelleting, and encrusting. Pellets obtained with pelleting are also known as seed pills. The coating is preferably applied over substantially the entire surface of the seed, such as over 90% or more of the surface area of the seed, to form a layer. However, the coating may be complete or partial, for instance over more than 20%, or more than 50% of the surface area of the seed.

The glass transition temperature ($T_g$) is known for many polymers and can if necessary be determined according to, for instance, ASTM E1356-08 (2014) "Standard Test Method for Assignment of the Glass Transition Temperatures by Differential Scanning calorimetry". For instance by DSC with drying at 110° C. for one hour to eliminate effect of water and/or solvent, DSC sample size of 10-15 mg, from −100° C. to 100° C. at 20° C./min under N2, with $T_g$ defined as midpoint of the transition region. Minimum film forming temperature (MFFT) can be measured for instance according to ASTM D2354-10e1.

The stabiliser polymer may be formed from copolymers of acid based monomers and hydrophobic monomers and may be a water soluble polymer, said solubility arising as a result of neutralisation of the polymer or monomers comprised therein.

The stabiliser polymer may have a $T_g$ in the range from 30° C. to 300° C., preferably 50° C. to 160° C., more preferably 70° C. to 150° C., and most preferably 80° C. to 120° C.

$T_g$ values in the specified ranges are desired to ensure that the resulting emulsion polymer doesn't create an overly sticky coating by which the coated seeds would simply stick together. The $T_g$ value of the stabiliser polymer may be controlled by the correct choice of co-monomers.

The stabiliser polymer is that it has to be of relatively low molecular weight for it to behave as a stabiliser. This means polymers having a molecular weight of less than 100,000. Higher molecular weight polymers would create high viscosities of the aqueous emulsion final product which will be detrimental to both manufacture and use. This aspect may be controlled by the polymerisation process.

The stabiliser polymer may have a molecular weight less than 50,000. Preferably, less than 35,000. More preferably, less than 25,000. The molecular weight may be in the range from 2,000 to 25,000. More preferably, in the range from 4,000 to 18,000. Further preferably, in the range from 6,000 to 12,000. Most preferably, in the range from 7,500 to 10,000.

Preferable stabiliser polymers are copolymers of acrylic acid with alkyl methacrylates or styrene with molecular weights of less than 20,000, and a $T_g$ of more than 30° C.

The acid based monomers of the stabiliser polymer may be selected from the broad groups of monomers which contain an acid such as carboxylic acid monomers, sulphonic acid monomers and phosphonic acid derivatives. The selection of monomer enables the stabiliser to be water soluble when in neutralised form and when copolymerised with hydrophobic monomers.

The stabiliser polymer may have a weight ratio of carboxylic acid to hydrophobe of 10-90:90-10, preferably 12-50:50-88, more preferably 15-40:85-60, and most preferably 20-30:80-70.

The acid based monomers of the stabiliser polymer may be selected from monomers of acrylic acid, methacrylic acid, itaconic acid, maleic acid, crotonic acid, sulphate acid derivatives of (meth)acrylic acid, sulphonic acid monomers such as AMPS, styrene sulphonic acid, vinyl sulphonic acid, allyl sulphonic acid, phosphonic acid derivatives such as vinyl phosphonic acid, or a mixture thereof. Preferably, acrylic acid, or methacrylic acid. More preferably, the monomer is methacrylic acid.

In an alternative embodiment the stabiliser polymer may be a homopolymer of polyvinyl alcohol (PVA), and said homopolymer may be hydrolysed at more than 70%.

The hydrophobe monomer may be vinyl monomer or vinyl aromatic monomer. Alternatively, the vinyl aromatic monomer may be replaced by other suitable monomers such as methyl methacrylate or other suitable alternatives.

Suitable vinyl aromatic monomers may preferably comprise from 8 to 20 carbon atoms, most preferably from 8 to 14 carbon atoms. Examples of vinyl aromatic monomers are styrene including substituted styrene, 1-vinyl naphthalene, 2-vinyl naphthalene, 3-methyl styrene, 4-propyl styrene, t-butyl styrene, 4-cyclohexyl styrene, 4-dodecyl styrene, 2-ethyl-4-benzyl styrene, 4-(phenylbutyl) styrene, alpha-methylstyrene, and halogenated styrenes.

The vinyl aromatic monomer(s) can be, and desirably is, styrene as such or a substituted styrene particularly a hydrocarbyl, desirably alkyl, substituted styrene, in which the substituent(s) are on the vinyl group or on the aromatic ring of the styrene e.g. α-methyl styrene and vinyl toluene.

The styrene monomer can be or include styrene monomers including strongly acid, particularly sulphonic acid substituents. When present such strong acid modified monomers usually form from 1 to 30 mol. %, more usually 2 to 20 mol. %, and desirably from 5 to 15 mol. %, of the styrene monomers in the copolymer.

Preferably the vinyl aromatic monomer is styrene, α-methyl styrene, or a combination thereof.

Where the vinyl aromatic monomer is a mixture of styrene and a substituted styrene the monomer mixture may comprise in the range from 80-95 wt. % styene and 5-20 wt. % substituted styrene.

Preferably the stabiliser polymer may be a styrene (meth) acrylic acid copolymer. The repeating units in the copolymer are conveniently considered as residues of monomer components.

In the water dispersible styrene (meth)acrylic copolymer used in the invention, the molar ratio of residues of the (meth)acrylic acid monomer(s) to those of the styrene monomer(s) is generally from 20:1 to 1:5, more usually 10:1 to 1:2 and particularly from 3:1 to 1:1.

Generally correspondingly, the proportions of residues of the monomers by weight are typically from 93 wt. % to 10 wt. %, more usually 87 wt. % to 25 wt. %, particularly 67 wt. % to 40 wt. %, of the (meth)acrylic acid monomer(s) and from 7 wt. % to 90 wt. %, more usually 13 wt. % to 75 wt. %, particularly 33 wt. % to 60 wt. %, of the styrene monomer(s).

The (meth)acrylic acid monomer(s) can comprise further monomers which are derivatives of (meth)acrylic acid. The derivatives of (meth)acrylic acid may include strong acid, and especially strong acids comprising sulphate acid or sulphonic acid groups (or their salts). Examples of such monomers include acrylamido methyl propyl sulphonate (AMPS) and (meth)acrylic acid isethionate.

When present such strong acid modified monomers usually form from 1 to 30 mol. %, more usually 2 to 20 mol. %, and desirably from 5 to 15 mol. %, of the acrylic acid monomers in the copolymer.

Other monomers, such as acidic monomers e.g. itaconic acid or maleic acid or anhydride; strongly acidic monomers such as methallyl sulphonic acid (or a salt); or non-acidic acrylic monomers e.g. acrylic esters which may be alkyl esters particularly $C_1$ to $C_6$ alkyl esters such as methyl methacrylate, butyl methacrylate or butyl acrylate or hydroxy alkyl esters particularly $C_1$ to $C_6$ hydroxyalkyl esters such as hydroxy ethyl methacrylate, or hydroxy propyl methacrylate; or vinyl monomers such as vinyl acetate, can be included. The proportion by weight of other monomers will typically be not more than about 30 wt. %, usually not more than about 20 wt. %, more usually not more than about 10 wt. %.

The polymer can be a single styrene acrylic acid copolymer or a blend including two or more such copolymers. In particular, when strong acid residues are included in the polymeric dispersant, the dispersant can be a blend of copolymer including strong acid residues and copolymer not including such residues. In such blends, it is generally desirable that the ratio of such copolymers is from 1:10 to 10:1, more usually 5:1 to 1:5, by weight. In particular, the proportion of copolymer including strong acid residues is desirably at least 25%, more usually at least 40%, by weight of the polymer.

The inclusion of monomers having strongly acidic substituent groups in the polymeric dispersant can provide improved dispersion of solid components in formulation such as solid granular agrochemical actives.

The polymer can be used as the free acid or as a salt. In practice, the form present in a formulation will be determined by the acidity of the formulation. Desirably, the formulation will be near neutral and so most of the acid groups will be present as salts. The cations in any such salt can be alkali metal, particularly sodium and/or potassium, ammonium, or amine, including alkanolamine such as ethanolamine, particularly tri-ethanolamine. In particular, sodium or potassium salts forms of the stabiliser polymer are preferred. Sodium salts may be especially preferred.

The neutralisation with at least 80% sodium is preferred, preferably 90%, most preferably greater than 95%.

The polymer used in the formulation of the invention may be wholly of styrene (meth)acrylic copolymers or it may include other dispersant materials such as the conventional dispersants mentioned above, such as naphthalene sulphonate formaldehyde condensates, lignosulphonates, maleic anhydride copolymers and condensed phenolsulphonic acid and their salts. When used in such combinations the weight ratio of styrene (meth)acrylic copolymer(s) to such conventional dispersants will usually be 16 to 2:1 respectively, and more usually 12 to 4:1, particularly from 10 to 6:1.

The stabiliser is preferably anionic.

The amount of acrylic acid monomer present in the stabiliser polymer may be in the range from 10 wt. % to 70 wt. %. Preferably, 20 wt. % to 60 wt. %. More preferably from, 25 wt. % to 50 wt. %. Most preferably, from 30 wt. % to 40 wt. %.

The amount of vinyl aromatic monomer present in the stabiliser polymer may be in the range from 90 wt. % to 30 wt. %. Preferably, 80 wt. % to 40 wt. %. More preferably from, 75 wt. % to 50 wt. %. Most preferably, from 70 wt. % to 60 wt. %.

The pH of the stabiliser may be in the range from 5 to 10. More preferably, in the range from 6 to 9. Further preferably, in the range from 7 to 9. Most preferably, in the range from 7.5 to 8.5.

The stabiliser polymer can be made by free radical initiated polymerisation, e.g. using a peroxide or a redox initiator, particularly by solution polymerisation, of the constituent monomers, optionally also with a chain transfer agent such as an alkyl mercaptan which acts to control the molecular weight of the polymer. Suitable methods are described for example in EP 0697422.

The stabiliser polymer may also be made by a solvent swap method in a hydrophilic solvent mixture, for example IPA/water mix, with addition of monomer feeds with initiator, monomer reacts and then distilled and neutralised simultaneously.

The core polymer is preferably a soft hydrophobic polymer which is water insoluble. Preferably the core polymer does not comprise water soluble monomers, and/or acid based monomers. The core polymer is preferably a neutral polymer.

The core polymer may have a $T_g$ in the range from $-100°$ C. to $0°$ C., preferably $-70°$ C. to $0°$ C., more preferably $-55°$ C. to $-10°$ C., and most preferably $-40$ to $-10°$ C.

The core polymer may comprise vinyl aromatic monomer and alkyl ester of acrylic or alkyl acrylic acid. Typically the core polymer is made up of hydrophobic alkyl (meth)acrylates, styrenes and vinyl compounds.

Preferable homopolymers of soft alkyl (meth)acrylates such as butyl acrylate and 2-ethylhexyl acrylate or copolymers with styrene.

The alkyl ester of acrylic or alkyl acrylic acid monomer may be selected from alkyl esters of acrylic acid or alkyl esters of methacrylic acid. Preferably, alkyl esters of acrylic acid.

Suitable alkyl esters of acrylic and methacrylic acid are, for example, methyl acrylate, methyl methacrylate, ethyl acrylate, ethyl methacrylate, propyl acrylate, butyl acrylate, pentyl acrylate, hexyl acrylate, and 2-ethyl hexyl acrylate. Preferably, 2-ethyl hexyl acrylate.

Suitable vinyl aromatic monomers are as already defined with regard to the stabiliser polymer.

The amount of vinyl aromatic monomer present in the stabiliser polymer may be in the range from 10 wt. % to 70 wt. %. Preferably, 15 wt. % to 55 wt. %. More preferably from, 20 wt. % to 45 wt. %. Most preferably, from 25 wt. % to 35 wt. %.

The amount of alkyl ester of acrylic or alkyl acrylic acid monomer present in the stabiliser polymer may be in the range from 90 wt. % to 30 wt. %. Preferably, 85 wt. % to 45 wt. %. More preferably from, 80 wt. % to 55 wt. %. Most preferably, from 75 wt. % to 65 wt. %.

Other examples of core polymers include those selected from acrylic polymers, styrene polymers and hydrogenated products thereof, vinyl polymers and derivatives thereof, polyolefins and hydrogenated or epoxidised products thereof, aldehyde polymers, epoxide polymers, polyamides, polyesters, polyurethanes, sulphone-based polymers and natural polymers and derivatives thereof.

Examples of acrylic monomers are (meth)acrylic acid or salts thereof, (meth)acrylamide, (meth)acrylonitrile, C1-6-alkyl (meth)acrylates such as ethyl (meth)acrylate, butyl (meth)acrylate or hexyl (meth)acrylate, 2-ethylhexyl (meth) acrylate, substituted C1-6-alkyl (meth)acrylates such as glycidyl methacrylate and acetoacetoxyethyl methacrylate, di(C1-4-alkylamino)C1-6-alkyl (meth)acrylates such as dimethylaminoethyl acrylate or diethylaminoethyl acrylate, amides formed from C1-6-alkylamines, substituted C1-6-alkyl-amines such as 2-amino-2-methyl-1-propane sulphonic acid, ammonium salt, or di(C1-4-alkyl-amino)C1-6-alkylamines and (meth)acrylic acid and C1-4-alkyl halide adducts thereof.

Examples of acrylic polymers are poly(methyl methacrylate) and poly(butyl methacrylate), as well as carboxylated acrylic copolymers as sold for example by Ciba under the tradenames Ciba® Glascol® LE15, LS20 and LS24, styrene acrylic copolymers as sold for example by Ciba under the tradenames Ciba® Glascol® LS26 and Ciba® Glascol® C44, and polyacrylic acid polymers as sold for example by Ciba under the tradename Ciba® Glascol® E11.

Examples of styrene monomers are styrene, 4-methylstyrene and 4-vinylbiphenyl. Examples of styrene polymers are styrene butadiene styrene block polymers, styrene ethylene butadiene block polymers, styrene ethylene propylene styrene block polymers and styrene-maleic anhydride copolymers.

Examples of vinyl monomers are vinyl alcohol, vinyl chloride, vinylidene chloride, vinyl isobutyl ether and vinyl acetate. Examples of olefin monomers are ethylene, propylene, butadiene and isoprene and chlorinated or fluorinated derivatives thereof such as tetrafluoroethylene. Examples of maleic monomers are maleic acid, maleic anhydride and maleimide.

Examples of vinyl polymers are polyvinyl chloride, polyvinylalcohol, polyvinylacetate, partially hydrolysed polyvinyl acetate and methyl vinyl ether-maleic anhydride copolymers. Examples of derivatives thereof are carboxy-modified polyvinyl alcohol, acetoacetyl-modified polyvinyl alcohol, diacetone-modified polyvinyl alcohol and silicon-modified polyvinyl alcohol.

Examples of polyolefines are polyethylene, polypropylene, polybutadiene and isopropylene-maleic anhydride copolymer Examples of aldehyde monomers are formaldehyde, furfural and butyral. Examples of alcohol monomers are phenol, cresol, resorcinol and xylenol. An example of polyalcohol is polyvinyl alcohol. Examples of amine monomers are aniline and melamine. Examples of urea monomers are urea, thiurea and dicyandiamide.

An example of an aldehyde polymer is polyvinyl butyral formed from butyral and polyvinylalcohol.

Examples of epoxide monomers are epichlorhydrine and glycidol. Examples of alcohol monomers are phenol, cresol, resorcinol, xylenol, bisphenol A and glycol. An example of epoxide polymer is phenoxy resin, which is formed from epichlorihydrin and bisphenol A.

An example of a monomer having an amide group is caprolactam. An example of a diamine is 1,6-diaminohexane. Examples of dicarboxylic acids are adipic acid, terephthalic acid, isophthalic acid and 1,4-naphthalene-dicarboxylic acid. Examples of polyamides are poyhexamethylene adipamide and polycaprolactam.

An example of a monomer having a hydroxy as well as a carboxy group is adipic acid. An example of a diol is ethylene glycol. An example of a monomer having a lactone group is carprolactone. Examples of dicarboxylic acids are terephthalic acid, isophthalic acid and 1,4-naphthalenedicarboxylic acid. An example of a polyester is polyethylene terephthalate. So-called alkyd resins are also regarded to belong to polyester polymers.

Examples of diisocyanate monomers are hexamethylene diisocyanate, toluene diisiocyanate and diphenylmethane diiscocyanate.

Examples of sulphone-based polymers are polyarylsulphone, polyethersulphone, polyphenyl-sulphone and polysulphone. Polysulphone is a polymer formed from 4,4-dichlorodiphenyl sulphone and bisphenol A.

Examples of natural polymers are starch, cellulose, gelatine, caesin and natural rubber. Examples of derivatives are oxidised starch, starch-vinyl acetate graft copolymers, hydroxyethyl cellulose, hydroxypropyl cellulose, methyl cellulose, ethyl cellulose, carboxymethyl cellulose and acetyl cellulose.

The core polymer may also be a mixture of polymeric binders, and/or it may be a mixture of liquid monomers and a suitable photoinitiator that forms one of the listed core polymers under UV irradiation after coating.

Preferably, the core polymer is selected from the group consisting of acrylic polymers, styrene polymers, vinyl polymers and derivatives thereof, polyolefins, polyurethanes and natural polymers and derivatives thereof.

More preferably, the core polymer is selected from the group consisting of acrylic polymers, styrene butadiene copolymers, styrene-maleic anhydride copolymers, polyvinyl alcohol, polyvinyl acetate, partially hydrolysed polyvinyl acetate, methyl vinyl ether-maleic anhydride copolymers, carboxy-modified polyvinyl alcohol, acetoacetyl-modified polyvinyl alcohol, diacetone-modified polyvinyl alcohol and silicon-modified polyvinyl alcohol, isopropylene-maleic anhydride copolymer, polyurethane, cellulose, gelatine, caesin, oxidised starch, starch-vinyl acetate graft copolymers, hydroxyethyl cellulose, methyl cellulose, ethyl cellulose, carboxymethyl cellulose and acetyl cellulose.

Most preferably the core polymer is selected from copolymers of an acrylate and a styrene. Said acrylate selected from the list comprising 2-ethyl-hexyl acrylate, butyl acrylate, sec-butyl acrylate, ethyl acrylate, methyl acrylate, acrylic acid, acrylamide, iso-butyl acrylate, methyl methacrylate, or combinations thereof. Said styrene selected from the list comprising styrene, tert-butyl styrene, para-methyl styrene, or combinations thereof.

The polymer desirably has a molecular weight of no more than 10,000.

The core polymers are known in the art and can be produced by known methods, e.g. by polymerisation starting from suitable monomers. The core polymer may preferably be formed in-situ when forming the emulsion polymer with the pre-formed stabiliser polymer.

The emulsion polymer may be made by any known method, and in particular by emulsion polymerisation. In particular the core polymer may be formed in-situ during the emulsion polymerisation process to form the core polymer stabilised with low molecular weight stabiliser.

It will be appreciated that other methods may be used to form the polymer, such as bulk polymerisation, may be used.

The reaction method used may form polymer droplets or particles.

Preferred emulsion polymers may be selected from the following:
  core polymer is 75% 2-ethylhexyl acrylate 25% styrene, stabiliser polymer is 65% acrylic acid 35% styrene, sodium salt (100%), molecular weight of ~10,000 Da, core:stabiliser ratio of 70:30, % solids measured as 46%.
  core polymer is 75% 2-ethylhexyl acrylate 25% styrene, stabiliser polymer is 52% acrylic acid 48% styrene, sodium salt (100%), molecular weight of ~6,500 Da, core:stabiliser ratio of 60:40, % solids measured as 44%.
  core polymer is 75% 2-ethylhexyl acrylate 25% styrene, stabiliser polymer is 28% acrylic acid 72% styrene, mixed sodium (66%) and ammonium (33%) salt, molecular weight of ~8,000 Da, core:stabiliser ratio of 70:30, % solids measured as 43%.
  core polymer is 75% 2-ethylhexyl acrylate 25% styrene, stabiliser polymer is 28% acrylic acid 72% styrene, mixed sodium (66%) and ammonium (33%) salt, molecular weight of ~8000 Da, core:stabiliser ratio of 70:30, % solids measured as 46.5%.

core polymer is 75% 2-ethylhexyl acrylate 25% styrene, stabiliser polymer is 28% acrylic acid 72% styrene, sodium salt (100%), molecular weight of ~8,000 Da, core:stabiliser ratio of 70:30, % solids measured as 55%.

core polymer is 75% 2-ethylhexyl acrylate 25% styrene, stabiliser polymer is 28% acrylic acid 72% styrene, sodium salt (100%), molecular weight of ~8,000 Da, core:stabiliser ratio of 60:40, % solids measured as 50.5%.

core polymer is 75% 2-ethylhexyl acrylate 25% styrene, stabiliser polymer is 28% acrylic acid 72% styrene, sodium salt (100%), molecular weight of ~8,000 Da, core:stabiliser ratio of 65:35, % solids measured as 45%.

core polymer is 75% butyl acrylate 25% styrene, stabiliser polymer is 28% acrylic acid 72% styrene, sodium salt (100%), molecular weight of ~8,000 Da, core:stabiliser ratio of 70:30, % solids measured as 45%.

core polymer is 75% 2-ethylhexyl acrylate 25% methyl methacrylate, stabiliser polymer is 28% acrylic acid 72% styrene, sodium salt (100%), molecular weight of ~8,000 Da, core:stabiliser ratio of 70:30, % solids measured as 45%.

core polymer is 75% 2-ethylhexyl acrylate 25% styrene, stabiliser polymer is 35% acrylic acid 65% methyl methacrylate, sodium salt (100%), molecular weight of ~6,500 Da, core:stabiliser ratio of 70:30, % solids measured as 45%.

core polymer is 75% 2-ethylhexyl acrylate 25% styrene, stabiliser polymer is 35% methacrylic acid 65% styrene, sodium salt (100%), molecular weight of ~6,500 Da, core:stabiliser ratio of 70:30, % solids measured as 45%.

The ratio of stabiliser polymer to core polymers in the emulsion polymer may be 50:50. More preferably, 40:60. Further preferably, 30:70. Most preferably the stabiliser will be present in the amount from 15-25 with the core being present in the amount from 85-75.

The emulsion polymer is preferably water soluble and water swellable.

The emulsion polymer and/or the stabiliser polymer have some grafting, and according to the present invention the term 'emulsion polymer' refers to systems of the two polymers which are not mere blends of each individual polymer and may be considered as a copolymer. It is shown that the emulsion polymer is not a mere blend of the individual polymers, and that a simple blend of polymers would not provide for the effects seen with the emulsion polymer of the present invention.

The polymers brought together in the emulsion copolymer may be thought to be incompatible, but bringing them together and forming some grating between the two allows the normally incompatible polymers to be brought together.

Optionally the stabiliser core copolymer may be cross-linked, and the method of making the emulsion polymer may comprise addition of a cross linker, with specific choice of cross linker determinable by the skilled person.

The viscosity of the emulsion polymer at 100 rpm may be less than 100 cP. Preferably, less than 80 cP. More preferably, less than 50 cP.

The viscosity of the emulsion polymer at 10 rpm may be less than 200 cP. Preferably, less than 150 cP. More preferably, less than 100 cP.

The solids content of the emulsion polymer is preferably in the range from 20 to 80%. More preferably, from 30 to 70%. Most preferably, from 40 to 60%.

In the form of a distribution of particle sizes, the polymer particles would have a median volume particle diameter value. It will be understood that the $D(v,0.9)$ particle diameter refers to the equivalent spherical diameter corresponding to the point on the distribution where equivalent spherical diameter corresponding to 90% or 10% respectively of the volume of all the particles, read on the cumulative distribution curve relating volume percentage to the diameter of the particles, i.e. it is the point where 10% of the distribution is above this value and 90% is below the value.

The particle size values, used to determine the $D(v,0.9)$ values were determined by dynamic light scattering analysis by using a Malvern Mastersizer 2000 with a Hydro 2000SM attachment running on water set at 2,100 rpm. The refractive index of the material is set as 1.53 with an absorbance of 0.1. 12,000 snaps were taken over 12 seconds to obtain the data. An average of three runs was used to determine a final particle size. From the particle size values obtained, $D(v,0.9)$ values were readily determined.

The polymer particles may have a $D(v,0.9)$ value in the range from 1,000 nm to 20 nm. Preferably, in the range from 500 nm to 30 nm. More preferably, in the range from 400 nm to 40 nm. Most preferably, in the range from 200 nm to 50 nm.

The emulsion polymer composition may also comprise additional component selected from colourants (pigments and dyes), micronutrients, agrochemical actives, bulking agents, and combinations thereof. These additional components may collectively be referred to herein as 'agrochemical compound or substance'.

Suitable bulking agents may be those materials which are relatively inert or do not present any compatibility problems, but which contribute volume to the seed coating. Bulking agents may be selected from inorganic particles such as talcs, powders, silicate particles, carbonate particles, sulphate particles, or other inert particles.

Examples of suitable silicate particles are silicate minerals, including clay minerals (such as kaolin, illite, smectite, montmorillonite, vermiculite, talc, palygorskite, and pyrophyllite)) and micas (such as phlogopite, biotite, zinnwaldite, lepidolite, muscovite, gluaconite, and clintonite). Preferred silicate particles include kaolinite, talc, and mica.

Suitable carbonate particles include carbonate minerals, such as calcium carbonate (commonly referred to as chalk), magnesium carbonate, sodium carbonate, barium carbonate, and dolomites (such as $CaFe(CO_3)_2$, $CaMg(CO_3)_2$, $CaZn(CO_3)_2$, and $BaCa(CO_3)_2$). Preferred carbonate particles include calcium carbonate, and dolomite.

Suitable sulphate particles include calcium sulphate, strontium sulphate, and barium sulphate. The preferred sulphate is barium sulphate.

Further inorganic particles that may be used in accordance with the invention include quartz, zeolites, pumice, perlite, diatomaceous earth, pyrogene silica, $Sb_2O_3$, $TiO_2$, lithopone, ZnO, and hydrated aluminium oxide.

The seed coating composition may comprise at least two selected from the group consisting of silicate particles, carbonate particles, and sulphate particles.

If present, the amount of the particles in the seed coating composition of the invention may be 35 wt. %, or more, based on the total weight of the coating composition, such as 40 wt. % or more, or 50 wt. % or more. A lower concentration of the particles in the composition generally results in more stickiness of the coated seed surfaces. The upper limit of the particles in the seed coating composition of the invention can be 98 wt. %, based on the total weight of the coating composition, such as 95 wt. %, 90 wt. % or 80 wt. %.

Suitable agrochemical actives for use in the formulations according to the invention are all agrochemically active compounds that may be solid or liquid at room temperature. It is envisaged that the emulsion polymer composition of the present invention would have broad applicability to all types of agrochemical actives.

Agrochemical actives refer to biocides which, in the context of the present invention, are plant protection agents, more particular chemical substances capable of killing different forms of living organisms used in fields such as medicine, agriculture, forestry, and mosquito control. Also counted under the group of biocides are so-called plant growth regulators.

In addition, the agrochemical actives include biopesticides. Biopesticides may be selected from bacteria, fungi, viruses, nematodes, protozoa, and yeast in any combination, where such biopesticides are capable of killing undesired living organisms.

Biocides for use in agrochemical formulations of the present invention are typically divided into two sub-groups:
  pesticides, including fungicides, herbicides, insecticides, algicides, moluscicides, miticides and rodenticides, and
  antimicrobials, including germicides, antibiotics, antibacterials, antivirals, antifungals, antiprotozoals and antiparasites.

In particular, biocides selected from insecticides, fungicides, or herbicides may be particularly preferred.

The term 'pesticide' will be understood to refer to any substance or mixture of substances intended for preventing, destroying, repelling, or mitigating any pest. A pesticide may be a chemical substance or biological agent (such as a virus or bacteria) used against pests including insects, plant pathogens, weeds, mollusks, birds, mammals, fish, nematodes (roundworms) and microbes that compete with humans for food, destroy property, spread disease or are a nuisance. In the following examples, pesticides suitable for the agrochemical compositions according to the present invention are given.

A fungicide is a chemical control of fungi. Fungicides are chemical compounds used to prevent the spread of fungi in gardens and crops. Fungicides are also used to fight fungal infections. Fungicides can either be contact or systemic. A contact fungicide kills fungi when sprayed on its surface. A systemic fungicide has to be absorbed by the fungus before the fungus dies.

Examples for suitable fungicides, according to the present invention, encompass the following species: (3-ethoxypropyl)mercury bromide, 2-methoxyethylmercury chloride, 2-phenylphenol, 8-hydroxyquinoline sulphate, 8-phenylmercuri oxyquinoline, acibenzolar, acylamino acid fungicides, acypetacs, aldimorph, aliphatic nitrogen fungicides, allyl alcohol, amide fungicides, ampropylfos, anilazine, anilide fungicides, antibiotic fungicides, aromatic fungicides, aureofungin, azaconazole, azithiram, azoxystrobin, barium polysulphide, benalaxyl-M, benodanil, benomyl, benquinox, bentaluron, benthiavalicarb, benzalkonium chloride, benzamacril, benzamide fungicides, benzamorf, benzanilide fungicides, benzimidazole fungicides, benzimidazole precursor fungicides, benzimidazolylcarbamate fungicides, benzohydroxamic acid, benzothiazole fungicides, bethoxazin, binapacryl, biphenyl, bitertanol, bithionol, blasticidin-S, Bordeaux mixture, boscalid, bridged diphenyl fungicides, bromuconazole, bupirimate, Burgundy mixture, buthiobate, butylamine, calcium polysulphide, captafol, captan, carbamate fungicides, carbamorph, carbanilate fungicides, carbendazim, carboxin, carpropamid, carvone, Cheshunt mixture, chinomethionat, chlobenthiazone, chloraniformethan, chloranil, chlorfenazole, chlorodinitronaphthalene, chloroneb, chloropicrin, chlorothalonil, chlorquinox, chlozolinate, ciclopirox, climbazole, clotrimazole, conazole fungicides, conazole fungicides (imidazoles), conazole fungicides (triazoles), copper(II) acetate, copper (II) carbonate, basic, copper fungicides, copper hydroxide, copper naphthenate, copper oleate, copper oxychloride, copper(II) sulphate, copper sulphate, basic, copper zinc chromate, cresol, cufraneb, cuprobam, cuprous oxide, cyazofamid, cyclafuramid, cyclic dithiocarbamate fungicides, cycloheximide, cyflufenamid, cymoxanil, cypendazole, cyproconazole, cyprodinil, dazomet, DBCP, debacarb, decafentin, dehydroacetic acid, dicarboximide fungicides, dichlofluanid, dichlone, dichlorophen, dichlorophenyl, dicarboximide fungicides, dichlozoline, diclobutrazol, diclocymet, diclomezine, dicloran, diethofencarb, diethyl pyrocarbonate, difenoconazole, diflumetorim, dimethirimol, dimethomorph, dimoxystrobin, diniconazole, dinitrophenol fungicides, dinobuton, dinocap, dinocton, dinopenton, dinosulphon, dinoterbon, diphenylamine, dipyrithione, disulphiram, ditalimfos, dithianon, dithiocarbamate fungicides, DNOC, dodemorph, dodicin, dodine, donatodine, drazoxolon, edifenphos, epoxiconazole, etaconazole, etem, ethaboxam, ethirimol, ethoxyquin, ethylmercury 2,3-dihydroxypropyl mercaptide, ethylmercury acetate, ethylmercury bromide, ethylmercury chloride, ethylmercury phosphate, etridiazole, famoxadone, fenamidone, fenaminosulph, fenapanil, fenarimol, fenbuconazole, fenfuram, fenhexamid, fenitropan, fenoxanil, fenpiclonil, fenpropidin, fenpropimorph, fentin, ferbam, ferimzone, fluazinam, fludioxonil, flumetover, fluopicolide, fluoroimide, fluotrimazole, fluoxastrobin, fluquinconazole, flusilazole, flusulphamide, flutolanil, flutriafol, folpet, formaldehyde, fosetyl, fuberidazole, furalaxyl, furametpyr, furamide fungicides, furanilide fungicides, furcarbanil, furconazole, furconazole-cis, furfural, furmecyclox, furophanate, glyodin, griseofulvin, guazatine, halacrinate, hex achlorobenzene, hex achlorobutadiene, hexachlorophene, hexaconazole, hexylthiofos, hydrargaphen, hymexazol, imazalil, imibenconazole, imidazole fungicides, iminoctadine, inorganic fungicides, inorganic mercury fungicides, iodomethane, ipconazole, iprobenfos, iprodione, iprovalicarb, isoprothiolane, isovaledione, kasugamycin, kresoxim-methyl, lime sulphur, mancopper, mancozeb, maneb, mebenil, mecarbinzid, mepanipyrim, mepronil, mercuric chloride, mercuric oxide, mercurous chloride, mercury fungicides, metalaxyl, metalaxyl-M, metam, metazoxolon, metconazole, methasulphocarb, methfuroxam, methyl bromide, methyl isothiocyanate, methylmercury benzoate, methylmercury dicyandiamide, methylmercury pentachlorophenoxide, metiram, metominostrobin, metrafenone, metsulphovax, milneb, morpholine fungicides, myclobutanil, myclozolin, N-(ethylmercury)-p-toluenesulphonanilide, nabam, natamycin, nitrostyrene, nitrothal-isopropyl, nuarimol, OCH, octhilinone, ofurace, organomercury fungicides, organophosphorus fungicides, organotin fungicides, orysastrobin, oxadixyl, oxathiin fungicides, oxazole fungicides, oxine copper, oxpoconazole, oxycarboxin, pefurazoate, penconazole, pencycuron, pentachlorophenol, penthiopyrad, phenylmercuriurea, phenylmercury acetate, phenylmercury chloride, phenylmercury derivative of pyrocatechol, phenylmercury nitrate, phenylmercury salicylate, phenylsulphamide fungicides, phosdiphen, phthalide, phthalimide fungicides, picoxystrobin, piperalin, polycarbamate, polymeric dithiocarbamate fungicides, polyoxins, polyoxorim, polysulphide fungicides, potassium azide, potassium polysulphide, potassium thiocyanate, probenazole, prochloraz, procymidone, propamocarb, propiconazole, propineb, proquinazid, prothiocarb, prothioconazole, pyracarbolid, pyraclostrobin, pyrazole fungicides, pyrazophos, pyridine fungicides, pyridinitril, pyrifenox, pyrimethanil, pyrimidine fungicides, pyroquilon, pyroxychlor, pyroxyfiir, pyrrole fungicides, quinacetol, quinazamid, quinconazole, quinoline fungicides, quinone fungicides, quinoxaline fungicides, quinoxyfen, quintozene, rabenzazole, salicylanilide, silthiofam, simeconazole, sodium azide, sodium orthophenylphenoxide, sodium pentachlorophenoxide, sodium polysulphide, spiroxamine, streptomycin, strobilurin fungicides, sulphonanilide fungicides, sulphur, sultropen, TCMTB, tebuconazole, tecloftalam, tecnazene, tecoram, tetraconazole, thiabendazole, thiadifluor, thiazole fungicides, thicyofen, thifluzamide, thiocarbamate fungicides, thiochlorfenphim, thiomersal, thiophanate, thiophanate-methyl, thiophene fungicides, thioquinox, thiram, tiadinil, tioxymid, tivedo, tolclofos-methyl, tolnaftate, tolylfluanid, tolylmercury acetate, triadimefon, triadimenol, triamiphos, triarimol, triazbutil, triazine fungicides, triazole fungicides, triazoxide, tributyltin oxide, trichlamide, tricyclazole, trifloxystrobin, triflumizole, triforine, triticonazole, unclassified fungicides, undecylenic acid, uniconazole, urea fungicides, validamycin, valinamide fungicides, vinclozolin, zarilamid, zinc naphthenate, zineb, ziram, zoxamide, and mixtures thereof.

An herbicide is a pesticide used to kill unwanted plants. Selective herbicides kill specific targets while leaving the desired crop relatively unharmed. Some of these act by interfering with the growth of the weed and are often based on plant hormones. Herbicides used to clear waste ground are non-selective and kill all plant material with which they come into contact. Herbicides are widely used in agriculture and in landscape turf management. They are applied in total vegetation control (TVC) programs for maintenance of highways and railroads. Smaller quantities are used in forestry, pasture systems, and management of areas set aside as wildlife habitat.

Suitable herbicides may be selected from the group comprising: aryloxycarboxylic acid e.g. MCPA, aryloxyphenoxypropionates e.g. clodinafop, cyclohexanedione oximes e.g. sethoxydim, hydroxybenzonitriles e.g. bromoxynil, sulphonylureas e.g. nicosulphuron, triazolopyrimidines e.g. penoxsulam, triketiones e.g. mesotriones, triazine herbicides such as metribuzin, hexaxinone, or atrazine; sulphonylurea herbicides such as chlorsulfuron; uracils such as lenacil, bromacil, or terbacil; urea herbicides such as linuron, diuron, siduron, or neburon; acetanilide herbicides such as alachlor, or metolachlor; thiocarbamate herbicides such as benthiocarb, triallate; oxadiazolone herbicides such as oxadiazon; isoxazolidone herbicides, phenoxyacetic acids; diphenyl ether herbicides such as fluazifop, acifluorfen, bifenox, or oxyfluorfen; dinitro aniline herbicides such as trifluralin; organophosphonate herbicides such as glufosinate salts and esters and glyphosate salts and esters; and/or dihalobenzonitrile herbicides such as bromoxynil, or ioxynil, benzoic acid herbicides, dipyridilium herbicides such as paraquat; and other herbicides such as clomazone, carfentrazone, saflufenacil, and pyroxasulphone.

Particularly preferred herbicides may be selected from 2,4-dichlorophenoxyacetic acid (2,4-D), atrazine, dicamba as benzoic acid, glyphosate, glufosinate, imazapic as imidazolinone, metolachlor as chloroacetamide, picloram, clopyralid, and triclopyr as pyridinecarboxylic acids or synthetic auxins, their respective water soluble salts and esters, and mixtures thereof.

An insecticide is a pesticide used against insects in all developmental forms, and include ovicides and larvicides used against the eggs and larvae of insects. Insecticides are used in agriculture, medicine, industry and the household.

Suitable insecticides may include those selected from: chlorinated insecticides such as, for example, Camphechlor, DDT, Hexachloro-cyclohexane, gamma-Hexachlorocyclohexane, Methoxychlor, Pentachlorophenol, TDE, Aldrin, Chlordane, Chlordecone, Dieldrin, Endosulphan, Endrin, Heptachlor, Mirex and their mixtures; organophosphorous compounds such as, for example, Acephate, Azinphosmethyl, Bensulide, Chlorethoxyfos, Chlorpyrifos, Chlorpyriphos-methyl, Diazinon, Dichlorvos (DDVP), Dicrotophos, Dimethoate, Disulphoton, Ethoprop, Fenamiphos, Fenitrothion, Fenthion, Fosthiazate, Malathion, Methamidophos, Methidathion, Methyl-parathion, Mevinphos, Naled, Omethoate, Oxydemeton-methyl, Parathion, Phorate, Phosalone, Phosmet, Phostebupirim, Pirimiphos-methyl, Profenofos, Terbufos, Tetrachlorvinphos, Tribufos, Trichlorfon and their mixture; carbamates such as, for example, Aldicarb, Carbofuran, Carbaryl, Methomyl, 2-(1-Methylpropyl) phenyl methylcarbamate and their mixtures; pyrethroids such as, for example, Allethrin, Bifenthrin, Deltamethrin, Permethrin, Resmethrin, Sumithrin, Tetramethrin, Tralomethrin, Transfluthrin and their mixtures; plant toxin derived compounds such as, for example, Derris (rotenone), Pyrethrum, Neem (Azadirachtin), Nicotine, Caffeine and their mixture; neonicotinoids such as imidacloprid; abamectin e.g. emamactin; oxadiazines such as indoxacarb; and/or anthranilic diamides such as rynaxypyr.

Miticides are pesticides that kill mites. Antibiotic miticides, carbamate miticides, formamidine miticides, mite growth regulators, organochlorine, permethrin and organophosphate miticides all belong to this category. Molluscicides are pesticides used to control mollusks, such as moths, slugs and snails. These substances include metaldehyde, methiocarb and aluminium sulphate. A nematicide is a type of chemical pesticide used to kill parasitic nematodes (a phylum of worm).

Most preferably, the active if present in the agrochemical formulation of the present invention is selected from an insecticide, and/or a fungicide. Preferably the insecticide, and/or a fungicide is a systemic insecticide, and/or a fungicide.

The concentration of the agrochemical active in the dilute formulation is not critical for the purposes of the present invention, and may be determined by other factors as required. The concentration of the agrochemical active concentrate is preferably in the range from 10 g/l to 800 g/l. More preferably, in the range from 75 g/l to 350 g/1. Most preferably, in the range from 90 g/l to 180 g/1.

Examples of colourants include dyes or pigmented pigment dispersions.

The emulsion polymer composition may comprise pigment, and this may be in combination with an active, micronutrient, and/or bulking agent. In one embodiment the emulsion polymer composition may only comprise pigment with no active, micronutrient, and/or bulking agent, and this may be where colour finish, flow enhancement, or dust reduction properties only are desired and where no active is required.

Examples of suitable dyes include: anthraquinone, triphenylmethane, phthalocyanine and derivatives thereof, and diazonium salts. Pigment dispersions can contain pigments such as pigment red 112 (CAS No. 6535-46-2), pigment red 2 (CAS No. 6041-94-7), pigment red 48:2 (CAS No. 7023-61-2), pigment blue 15:3 (CAS No. 147-14-8), pigment green 36 (CAS No. 14302-13-7), pigment green 7 (CAS No. 1328-53-6), pigment yellow 74 (CAS No. 6358-31-2), pigment orange 5 (CAS No. 3468-63-1), pigment violet 23 (CAS No. 6358-30-1), pigment black 7 (CAS No. 97793-37-8), and pigment white 6 (CAS No. 98084-96-9).

The colourant may be present in the seed coating composition in an amount of 0-50 wt. %, such as 1-10 wt. %, based on the total weight of the coating composition.

Examples of suitable effect pigments include pearlescent pigment in different particle sizes. Effect pigments having a particle size of 15 µm or less, or a particle size of 60 µm or less are commonly used. The particle size of the effect pigments is normally not more than 200 µm, preferably not more than 100 µm. Usually, the particle size of the effect pigment is 1 µm or more. Another effect pigment can be aluminium. All effect pigments are commonly used to create a nice cosmetic look on the seeds.

The emulsion polymer composition may comprise at least one micronutrient. In such concentrates the micronutrient is typically in a dry form.

Nutrients refer to chemical elements and compounds which are desired or necessary to promote or improve plant growth. Nutrients generally are described as macronutrients or micronutrients. Suitable nutrients for use according to the invention are micronutrient compounds, preferably those which are solid at room temperature or are partially soluble.

Micronutrients typically refer to trace metals or trace elements, and are often applied in lower doses. Suitable micronutrients include trace elements selected from zinc, boron, chlorine, copper, iron, molybdenum, and manganese. It is envisaged that the dispersant of the present invention would have broad applicability to all types of micronutrients.

The micronutrients may be in a soluble form or included as insoluble solids, and may in the form of salts or chelates. Preferably, the micronutrient is in the form of a carbonate or oxide.

Preferably, the micronutrient may be selected from zinc, calcium, molybdenum or manganese, or magnesium. Particularly preferred micronutrients for use with the present invention may be selected from zinc oxide, manganese carbonate, manganese oxide, or calcium carbonate.

The amount of micronutrient present is typically from 5 wt. % to 40 wt. %, more usually, 10 wt. % to 35 wt. %, particularly 15 wt. % to 30, % by weight based on the total concentrate.

Typically, as mixed into formulations during make up the average particle size of solid agrochemicals is from 50 µm to 100 µm, but formulations are typically wet milled after mixing to reduce the average particle size to from 1 µm to 10 µm, more preferably from 1 µm to 5 µm.

The present invention may also comprise at least one macronutrient. Macronutrients typically refer to those comprising nitrogen, phosphorus, and potassium, and include fertilisers such as ammonium sulphate, and water conditioning agents. Suitable macronutrients include fertilisers and other nitrogen, phosphorus, or sulphur containing compounds, and water conditioning agents.

Suitable fertilisers include inorganic fertilisers that provide nutrients such as nitrogen, phosphorus, potassium or sulphur. Examples of such fertilisers include:

for nitrogen as the nutrient: nitrates and or ammonium salts such as ammonium nitrate, including in combination with urea e.g. as uran type materials, calcium ammonium nitrate, ammonium sulphate nitrate, ammonium phosphates, particularly mono-ammonium phosphate, di-ammonium phosphate and ammonium polyphosphate, ammonium sulphate, and the less commonly used calcium nitrate, sodium nitrate, potassium nitrate and ammonium chloride;

for phosphorus as the nutrient: acidic forms of phosphorus such as phosphoric, pyrophosphoric or polyphosphoric acids, but more usually salt forms such as ammonium phosphates, particularly mono-ammonium phosphate, di-ammonium phosphate, and ammonium polyphosphate, potassium phosphates, particularly potassium dihydrogen phosphate and potassium polyphosphate;

for sulphur as the nutrient: ammonium sulphate and potassium sulphate, e.g. the mixed sulphate with magnesium.

If only dust reduction properties only are desired the emulsion polymer composition may comprise no pigment, dye, active, micronutrient, or bulking agent.

The emulsion polymer composition may also include other components as desired. These other components may be selected from those including:

binders, particularly binders which are readily water soluble to give low viscosity solutions at high binder concentrations, such as polyvinylpyrrolidone; polyvinyl alcohol; carboxymethyl cellulose; gum arabic; sugars e.g. sucrose or sorbitol; starch; ethylene-vinyl acetate copolymers, sucrose and alginates, diluents, absorbents or carriers such as carbon black; talc; diatomaceous earth; kaolin; aluminium, calcium or magnesium stearate; sodium tripolyphosphate;

sodium tetraborate; sodium sulphate; sodium, aluminium and mixed sodium-aluminium silicates; and sodium benzoate, disintegration agents, such as surfactants, materials that swell in water, for example carboxy methylcellulose, collodion, polyvinylpyrrolidone and microcrystalline cellulose swelling agents; salts such as sodium or potassium acetate, sodium carbonate, bicarbonate or sesquicarbonate, ammonium sulphate and dipotassium hydrogen phosphate;

wetting agents such as alcohol ethoxylate and alcohol ethoxylate/propoxylate wetting agents;

dispersants such as sulphonated naphthalene formaldehyde condensates and acrylic copolymers such as the comb copolymer having capped polyethylene glycol side chains on a polyacrylic backbone;

emulsifiers such as alcohol ethoxylates, ABA block co polymers, or castor oil ethoxylates;

antifoam agents, e.g. polysiloxane antifoam agents, typically in amounts of 0.005 wt. % to 10 wt. % of the formulation;

viscosity modifiers such as commercially available water soluble or miscible gums, e.g. xanthan gums, and/or cellulosics, e.g. carboxy-methyl, ethyl or propylcellulose; and/or preservatives and/or anti-microbials such as organic acids, or their esters or salts such as ascorbic e.g. ascorbyl palmitate, sorbic e.g. potassium sorbate, benzoic e.g. benzoic acid and methyl and propyl 4-hydroxybenzoate, propionic e.g. sodium propionate, phenol e.g. sodium 2-phenylphenate; 1,2-benzisothiazolin-3-one; or formaldehyde as such or as paraformaldehyde; or inorganic materials such as sulphurous acid and its salts, typically in amounts of 0.01 wt. % to 1 wt. % of the formulation.

The emulsion polymer composition according to the present invention may also contain components, such as surfactant materials which form part of the emulsifier system. Said surfactants may include surfactant dispersants.

The emulsion polymer may in particular include an additional polymer. Said additional polymer may have having a $T_g$ 30° C. to 300° C., and may be selected from polymers described herein as stabiliser polymers.

Therefore, according to a ninth aspect of the present invention there is provided an emulsion polymer system for agrochemical use comprising a core-stabiliser copolymer, said copolymer comprising;

a stabiliser polymer comprising acid based and hydrophobe monomers having a weight/number ratio of said acid to hydrophobe of 10-90:90-10, a $T_g$ in the range from 30° C. to 300° C., and a molecular weight less than 100,000; and a core polymer having a $T_g$ in the range from −100° C. to 10° C.; and a polymer, said copolymer having a $T_g$ in the range from 30° C. to 300° C.

Other adjuvants not within the scope of the present invention, such as surfactant adjuvants, may be included in the compositions and formulations of and used in this invention. Examples include alkylpolysaccharides (more properly called alkyl oligosaccharides); fatty amine ethoxylates e.g. coconut alkyl amine 2EO; and derivatives of alk(en)yl succinic anhydride, in particular those described in PCT applications WO 94/00508 and WO 96/16930.

The emulsion polymer composition may also comprise water in the amount from 30 to 70 wt. %. Preferably, from 40 to 50 wt. %

The emulsion polymer system is designed to be diluted with water (or a water based liquid) to form the corresponding use formulations. Said compositions include those in liquid form (such as solutions, emulsions, or dispersions) and in solid form (especially in water dispersible solid form) such as granules or powders.

The term 'coating formulation' as used herein refers to compositions is intended to include all forms of compositions, including diluted concentrates and spray formulations. If not specifically stated, the coating formulation of the present invention may be in the form of a diluted emulsion polymer composition, or a sprayable formulation.

According to the needs of the customer, said emulsion polymer system may be diluted for use resulting in a dilute coating composition. The resulting concentration in the diluted coating (the formulation) of the emulsion polymer system may be about 0.2 wt. % to about 2 wt. % in total.

When emulsion polymer compositions are used, the emulsion polymer composition will typically be diluted to form the coating formulations. The dilution may be with from 1 to 10,000, particularly 10 to 1,000, times the total weight of the emulsion polymer composition of water to form the coating formulation.

The coating formulation may include solvents (other than water) such as monopropylene glycol, oils which can be vegetable or mineral oils such as spray oils (oils included in spray formulations as non-surfactant adjuvants), associated with the first and co-adjuvants. Such solvents may be included as a solvent for the adjuvant, and/or as a humectant, e.g. especially propylene glycol. When used such solvents will typically be included in an amount of from 5 wt. % to 500 wt. %, desirably 10 wt. % to 100 wt. %, by weight of the adjuvant. Such combinations can also include salts such as ammonium chloride and/or sodium benzoate, and/or urea especially as gel inhibition aids.

The invention further includes a method of treating plants or seeds using coating formulations as defined herein. The emulsion polymer may be used in coating compositions for application or coating of any part of a seed or plant. The emulsion polymer may particularly find use for coating compositions for coating seeds.

Accordingly the invention further includes methods of use including a method of providing micronutrients, actives, dyes, pigments, and/or bulking agents to vegetation or seeds, by applying to said vegetation or seeds a coating formulation including at least one emulsion polymer composition of the first aspect.

Coatings comprising the emulsion polymer system of the present invention provide good adherence to a surface of a seed or other part of a plant, and reduced wash-off. The formulation applied can comprise actives, pigments, etc. as noted herein, and to hold those components at the seed or plant surface.

A particularly advantageous effect of the emulsion polymer of the present invention is that it improves germination of the seeds and this is thought to be as a result of the polymer system providing increased water retention in the coating on the seed.

The emulsion polymer system of the present invention when applied to a seed surface provides for an increase in seeds achieving stage 6 germination within a 6 day incubation period of at least 100%, more preferably 150%, most preferably 200% when compared to untreated seeds.

The emulsion polymer system of the present invention when applied to a seed surface provides for an increase in seeds achieving a higher average growth stage within a 6 day incubation period of at least 5%, more preferably 8%, most preferably 10% when compared to untreated seeds.

Therefore germination is both faster, and with more seeds getting to a later stage of germination. It can be seen that there is a mass increase after coating and when soaked in water which shows that water is absorbed which represents the water uptake properties provided by an emulsion polymer comprising coating.

The specific methodology of the germination test for average growth stage and stage 6 is as described herein.

The coatings comprising the emulsion polymer system also provide good dust off and abrasion resistance thereby reducing dust produced during movement of the seeds and allowing lower amounts of active to be incorporated due to decreased coating loss.

The emulsion polymer also provides for coatings which are more uniform across a seed, and good film forming properties and no need for an added film-former. The coating is also found to be tough and flexible coating with good adhesion.

Coatings comprising the emulsion polymer system also provide good wet and dry flow to coated seeds. The result of this is the seeds can be bagged and sold to be used later or used straight away, and seeds are not wet as this would result in seeds stick together during storage.

The coatings formed comprising the emulsion polymer of the present invention also provide for a desired viscosity which allows for ease of handling and application to any seeds to be coated.

All of the features described herein may be combined with any of the above aspects, in any combination.

In order that the present invention may be more readily understood, reference will now be made, by way of example, to the following description.

It will be understood that all tests and physical properties listed have been determined at atmospheric pressure and room temperature (i.e. 25° C.), unless otherwise stated herein, or unless otherwise stated in the referenced test methods and procedures.

The following test methods were used to determine performance of the adjuvant compositions.

Viscosity—

Samples were tested on a Brookfield DV-2 viscometer using the small sample adapter with spindle 27. Viscosity readings were taken after 1 minute at 10 rpm and 100 rpm.

Wet & Dry Flow—

Flow testing (wet and dry) was carried out in accordance with test as described in WO 2011/014720.

Germination Testing—

Germination testing was carried out in accordance with the following test method:
- Approx. 1 m of paper towel (4 squares) is folded and wet with 20 mL water
- 50 coated seeds are spread over the wet towel
- The paper towel containing the seeds is then rolled up
- It is then placed in a jar with a further 20 ml of water, covered with a plastic bag and secured (see image 1)
- The jars are placed in a growth cabinet for 5 nights, 6 days (temperature controlled at 25° C. and in darkness)
- The seeds are then classified and counted (see image 2 for guidance)

Upon completion of the above protocol the seeds were split into six categories for no germination, sprout visible, root and sprout visible, multiple roots and sprout visible, multiple roots and sprout large sprout, multiple roots and large sprout with first with first leaf clearly visible.

The conditions are in line with the International Rules for Seed Testing (ISTA).

Water Uptake—

The method was carried out as follows: 10 seeds (treated or untreated) are accurately weighed to 3 d.p, these were then placed into another beaker containing 20 ml of deionised water. This mixture was then stirred using a magnetic stirrer bar and after the relevant time period the contents are passed through a sieve to catch the seeds. The wet seeds were then weighed and their wet weight recorded.

The seeds are then returned to the stirring water to await the next time interval with the test repeated. The amount of water absorbed over the intervening time period was then calculated and a percentage mass increase calculation was used to represent mass increase over time of with various treatments.

Dust—

Dust-off was measured by the industry standard, Heubach dust method provided by the European Seed Association. This is the accepted assessment of free floating dust and abrasion particles of treated seeds as a parameter of the quality of treated seeds. 100 grams of seeds were submitted to a five minute Heubach test in triplicate, averaging the results to a total amount of dust-off per 100 kilograms of seeds.

Synthesis

Stabiliser

The reaction method used is a solution polymerisation, where all the monomer ingredients were added into the solvent mix of water and isopropyl alcohol and reacted together.

The water bath temperature was set at 90° C. The apparatus was degassed for 1 hour under nitrogen. The reactor ingredients were added to the reactor under stirring and reflux. The monomer feed was primed and fed in over 3 hours. Simultaneously the initiator feed was primed and fed in over 4 hours. When all the feeds had been added the system was left for a further one hour to ensure all the monomer has been reacted.

The solution polymer was then left to cool. When cold, the solution polymer was removed from the vessel. The polymer was distilled using a rotary evaporator and neutralised using sodium hydroxide or ammonium as indicated.

The stabiliser polymers as listed in Table 1 were all synthesised using the above detailed method.

TABLE 1

Reaction recipe for stabiliser polymers produced

| Ingredient | SP1 Components (g) | SP2 Components (g) |
|---|---|---|
| Reactor | | |
| Propan-2-ol | 500 | 312.5 |
| Deionised water | 150 | 0 |
| Monomer feed | | |
| Styrene | 162 | 94.5 |
| Acrylic acid | 300 | 115.5 |
| Initiator feed | | |
| Bruggolite FF7 | 20 | 20 |
| Deionised water | 180 | 240 |
| tert-Butyl hydroperoxide | 25 | 25 |
| Deionised water | 175 | 210 |
| IPA | | 25 |

In addition the following stabiliser polymers were used.

SP3—stabiliser 28% acrylic acid, 72% styrene, MW ~8000, 100% Na salt

SP4—ammonium salt version of SP3

SP5—stabiliser 50% methacrylic acid, 50% styrene, MW <15,000, 100% Na salt

SP6—stabiliser 35% acrylic acid, 65% styrene, MW <15,000, 100% Na salt

Emulsion Polymer

Emulsion polymer comprising the stabiliser polymers listed in Table 1 were formed. The reaction method used was an emulsion polymerisation, with the recipe followed as per Table 2. The polymers produced in Table 1 were used as the stabiliser and the additional monomers added form the polymer droplets.

Water bath was used and set at a temperature of 90° C. The apparatus was degassed for 1 hour under nitrogen. The reactor ingredients were added to the reactor under stirring and reflux. The monomer and initiator feeds were primed. Monomer and initiator feeds were simultaneously fed into the reactor over 3 and 4 hours respectively. When all monomer and initiator had been added the vessel it was left for a further 1 hour and the emulsion polymer was then left to cool. When the emulsion polymer had cooled to room temperature, the resultant polymer was removed from the vessel and assessed for solids content by generating a dry weight measurement.

TABLE 2

Reaction recipe for all seed emulsion polymers produced

| Ingredient | EP1 | EP2 | EP3 | EP4 | EP5 | EP6 | EP7 |
|---|---|---|---|---|---|---|---|
| Reactor | | | Components in grams | | | | |
| Deionised water | 126 | 95 | 104.2 | 110.6 | 98 | 68.2 | 66 |
| SP1 (45.3%) | 166 | | | | | | |
| SP2 | | 303 | | | | | |

TABLE 2-continued

Reaction recipe for all seed emulsion polymers produced

| Ingredient | EP1 | EP2 | EP3 | EP4 | EP5 | EP6 | EP7 |
|---|---|---|---|---|---|---|---|
| (35.1%) SP3 | | | 165 | 75.5 | 250 | 300 | 299.7 |
| (32.8%) SP4 | | | 77.3 | 154.7 | | | |
| (33.0%) Ammonium persulphate | 0.33 | 0.33 | 0.33 | 0.33 | 0.33 | 0.33 | 0.3 |

| Monomer feed | Components in grams | | | | | | |
|---|---|---|---|---|---|---|---|
| 2-ethylhexyl acrylate | 122.5 | 112 | 131.25 | 131.25 | 131.25 | 111.375 | 121.9 |
| Styrene | 52.5 | 48 | 43.75 | 43.75 | 43.7 | 37.125 | 40.6 |

| Initiator feed | Components in grams | | | | | | |
|---|---|---|---|---|---|---|---|
| Deionised water | 32 | 32 | 32 | 32 | 32 | 32 | 32 |
| Ammonium persulphate | 1 | 0.9 | 1 | 1 | 1 | 1 | 1 |

The emulsion polymers produced and listed in Table 2 are further detailed:

EP1—core is 2-ethylhexyl acrylate, styrene, stabiliser is 65% acrylic acid 35% styrene, core:stabiliser ratio is 70/30, % solids is 46.2.

EP2—core is 75% 2-ethylhexyl acrylate, 25% styrene, stabiliser is 52% acrylic acid, 48% styrene, stabiliser molecular weight ~6500, 100% Na salt, core:stabiliser ratio is 60/40, % solids is 44.2.

EP3—core is 75% 2-ethylhexyl acrylate, 25% styrene, stabiliser is 28% acrylic acid, 72% styrene, stabiliser molecular weight ~8000, 33% NH3 salt and 66% Na salt, core:stabiliser ratio is 70/30, % solids is 43.4.

EP4—core is 75% 2-ethylhexyl acrylate, 25% styrene, stabiliser is 28% acrylic acid, 72% styrene, stabiliser molecular weight ~8000, 66% NH3 salt and 33% Na salt, core:stabiliser ratio is 70/30, % solids is 46.53.

EP5—core is 75% 2-ethylhexyl acrylate, 25% styrene, stabiliser is 28% acrylic acid, 72% styrene, stabiliser molecular weight ~8000, 100% Na salt, core:stabiliser ratio is 70/30, % solids is 55.

EP6—core is 75% 2-ethylhexyl acrylate, 25% styrene, stabiliser is 28% acrylic acid, 72% styrene, stabiliser molecular weight ~8000, 100% Na salt, core:stabiliser ratio is 60/40, % solids is 50.51.

In addition, the following seed emulsion polymers were produced:

EP7—core is 75% 2-behenyl acrylate, 25% styrene, stabiliser is SP3, core:stabiliser ratio is 70/30, % solids is 45.1.

EP8—core is 75% 2-ethylhexyl acrylate, 25% methyl methacrylate, stabiliser is SP3, core:stabiliser ratio is 70/30, % solids is 45.

EP9—core is 75% 2-ethylhexyl acrylate, 25% styrene, stabiliser is SP5, core:stabiliser ratio is 65/35, % solids is 44.9.

EP10—core is 75% 2-ethylhexyl acrylate, 25% styrene, stabiliser is SP6, core:stabiliser ratio is 65/35, % solids is 45.3.

FORMULATIONS

Coating formulations of each of the emulsions listed in Table 2 were prepared using the following method. All ingredients except premix water, xanthan, Vangel B and imidacloprid were combined under stirring 500 rpm. Imidacloprid was added whilst under continuous stirring.

The slurry was then milled for 15 minutes 3,500 rpm using an Eigar Torrence mini motor mull. The remaining ingredients were added as a premix with stirring 500 rpm, and the formulation was stirred until homogeneous at 500 rpm.

The following coating formulations formed

CON—no emulsion polymer (control), deionised water (solvent) 40.74 w/w %

CF1—12.83 w/w % EP1, deionised water (solvent) 27.905 w/w %

CF2—13.47 w/w % EP1, deionised water (solvent) 27.265 w/w %

CF3—13.05 w/w % EP1, deionised water (solvent) 27.685 w/w %

CF4—12.74 w/w % EP1, deionised water (solvent) 27.995 w/w %

CF5—10.78 w/w % EP1, deionised water (solvent) 31.915 w/w %

CF6—11.73 w/w % EP1, deionised water (solvent) 30.965 w/w %

CF7—13.16 w/w % EP1, deionised water (solvent) 27.58 w/w %

All coating formulations also comprised:

| | |
|---|---|
| Atlox 4913 (Dispersant) | 4.83 w/w % |
| Atlas G5002L (Wetting agent) | 0.97 w/w % |
| Unisperse red 3RS-E2 (Pigment dispersion) | 4.00 w/w % |
| Imidachloprid (95.1%) (Active) | 48.25 w/w % |
| Vangel B (Structuring agent) | 0.175 w/w % |
| Propylene glycol (Liquid plasticizer) | 1.00 w/w % |
| Xanthan gum (Structuring agent) | 0.04 w/w % |

Seed Treatment

The formulation formed were applied as a seed treatment after 24 hours at room temperature. The treatment was applied to winter wheat seed (ex-Wood Head Seeds) at a treatment rate of 0.6 g A.I. per kg of wheat seed.

The formulation was diluted to a slurry rate of 10.4 ml/kg (in accordance with Valent patent US2012/088806) and 1.03 ml of the FS and 9.37 ml of deionised water was used to form the slurry.

The seeds were treated with 500 g of winter wheat treated with 1.04 ml per 100 g (5.2 ml in total) of slurry in a Winterseiger seed treater for 1 minute.

Viscosity & Flowability

The emulsion polymers were tested for stability, viscosity, and flowability using the methods noted herein. Observations on the form of the emulsion were also noted. Results are shown in Table 3. The results are for the emulsion polymers prior to addition of components to make the agrochemical active containing formulation. Stability and flowability are visual observations on whether the emulsion had suffered any separation.

TABLE 3

Viscosity & flowability results

| Formulation | Viscosity (cP 10 RPM) | Viscosity (cP 100 RPM) |
| --- | --- | --- |
| CF1 | 200 | 163 |
| CF2 | 1150 | 553 |
| CF3 | <20 | <20 |
| CF4 | <20 | <20 |
| CF5 | 50 | <20 |
| CF6 | 100 | <20 |

The results in Table 4 show emulsion polymers consistent having low viscosity, stability, and flowability. These properties are desired for ease of formulation, handleability, and useability. The desired properties also are obtained even when using high molecular weight stabiliser (10,000 Daltons).

Wet Flow

The seeds treated with formulations comprising emulsion polymers were tested for wet flow using the method noted herein. Results are shown in Table 4.

TABLE 4

Wet flow of treated seeds

| Formulation | Average (g/s) |
| --- | --- |
| CF1 | 105.8 |
| CF2 | 112.8 |
| CF3 | 115.1 |
| CF4 | 110.0 |
| CF5 | 116.0 |
| CF6 | 113.2 |

The seed all provided good wet flow results. The values represent the amount of flow through the funnel, and all values are in the range which would be desired.

Dry Flow

The seeds treated with formulations comprising emulsion polymers were tested for dry flow using the method noted herein. Results are shown in Table 5.

TABLE 5

Dry flow of treated seeds

| Formulation | Average (g/s) |
| --- | --- |
| CF1 | 155.5 |
| CF2 | 150.5 |
| CF3 | 148.6 |
| CF4 | 153.2 |
| CF5 | 146.6 |
| CF6 | 152.4 |

The seed all provided good dry flow results. The values show the seeds have dried and this can be seen as the values have increased substantially when compared to the wet flow results.

Germination Testing

The seeds treated with formulations comprising emulsion polymers were tested for germination using the method noted herein. A set of untreated seed was tested as a control. Results are shown in Table 6.

TABLE 6

Germination results for treated seeds

| Formulation | Average % Growth stage | Difference in germination over untreated | % Increase in germination over untreated |
| --- | --- | --- | --- |
| Untreated | 4.22 | N/A | N/A |
| CF1 | 5.04 | 0.82 | 19 |
| CF2 | 4.66 | 0.44 | 10 |
| CF3 | 5.1 | 0.88 | 21 |
| CF4 | 4.98 | 0.76 | 18 |
| CF5 | 5.18 | 0.96 | 23 |
| CF6 | 5.32 | 1.1 | 26 |

The seeds are counted and classified as outlined in the methodology above. When this is complete the amount of seeds in each stage of growth is recorded (1-6). An average is then obtained by multiplying the number of seeds at each stage by the stage number and the dividing by 50 (total number of seeds). An example of the calculation is below (number at stage 1×1+number at stage 2×2+number of stage 3×3+number of stage 4×4+number of stage 5×5+number stage 6×6)/50

This then gives the average growth stage the set of 50 seed reached. The higher this number the more seeds reached the later stages of growth in the testing.

TABLE 7

Germination results for treated seeds

| Formulation | Stage 6% | % Improvement to stage 6 over untreated |
| --- | --- | --- |
| Untreated | 4 | N/A |
| CF1 | 24 | 300 |
| CF2 | 18 | 225 |
| CF3 | 34 | 425 |
| CF4 | 20 | 250 |
| CF5 | 32 | 400 |
| CF6 | 50 | 625 |

The results in Table 7 show the percentage of seeds developed to stage 6 germination during the 6 day incubation period, and the percentage improvement when compared to a baseline of untreated seeds.

It should be noted that all the treated seeds have improved germination compared to the untreated seeds, and that more seeds get to later stages of germination quicker than uncoated seeds.

At each germination stage the seeds treated with the emulsion polymer have reached a much more mature level of growth when compared to untreated seeds. This was shown by the observed increased number and length of roots and by the emergence of the first true leaf from the coleoptile.

Water Uptake

The seeds treated with formulations comprising emulsion polymers were tested for water uptake using the method noted herein. A set of untreated seed was tested as a control. Results are shown in Table 8.

TABLE 8

Water uptake results over time for treated seeds

| Formu-lation | % Mass Increase | | | | |
|---|---|---|---|---|---|
| | 1 minute | 5 minutes | 15 minutes | 30 minutes | 1 hour |
| CON | 18.3 | 33.3 | 46.6 | 41.7 | 71.8 |
| CF1 | 22.9 | 46.9 | 65.4 | 75.5 | 81.3 |
| CF2 | 27.0 | 39.9 | 58.9 | 73.0 | 84.6 |
| CF3 | 47.0 | 56.9 | 64.4 | 79.5 | 83.0 |
| CF4 | 45.2 | 47.3 | 48.1 | 62.5 | 79.2 |
| CF5 | 65.2 | 69.3 | 72.5 | 81.6 | 101.3 |
| CF6 | 67.1 | 73.8 | 78.3 | 80.2 | 105.9 |

The results show water absorption for all the polymers, with all the polymer treated seeds showing increased water absorption compared to a polymerless formulation. The increased water absorption is shown both during early time intervals and longer time intervals Dust The seeds treated with formulations comprising emulsion polymers were tested for dust-off using the method noted herein. A set of untreated seed was tested as a control. Results are shown in Table 9.

TABLE 9

Dust-off results over time for treated seeds

| Formulation | Average dust (g/100 kg of seeds) |
|---|---|
| Untreated | 1.20 |
| CF5 | 0.91 |
| CF6 | 0.75 |

The dust off performance results for the treated seeds is significantly improved compared the untreated seeds.

In the case of treated wheat seeds, untreated seeds give off 1.2 grams of dust per 100 kilograms of seeds, which can be reduced by a quarter when the coating composition contains CF5 or by almost 40% with the inclusion of CF6 as example emulsion polymers described herein. Less dust off also means more coating remains on the seed.

SUMMARY

The results show that the emulsion polymer exhibits improved wet and dry flow, are very low viscosity ~100 cps, has good germination enhancement, and good water absorption enhancement.

It is to be understood that the invention is not to be limited to the details of the above embodiments, which are described by way of example only. Many variations are possible.

The invention claimed is:

1. An emulsion polymer system for agrochemical use comprising a core-stabiliser copolymer, said copolymer comprising;
a stabiliser polymer comprising monomers of a vinyl aromatic and acrylic acid or a vinyl aromatic and methacrylic acid having a weight/number ratio of 15-40:85-60, respectively, a $T_g$ in the range from 30° C. to 300° C., and a molecular weight of 6,500 to 10,000; and
a water insoluble core polymer comprising monomers of a vinyl aromatic and an alkyl ester of acrylic acid or an alkyl acrylic acid and having a $T_g$ in the range from –100° C. to 10° C., wherein:
the emulsion polymer has a solids content of 30 to 70% and a particle size distribution D(v,0.9)s value of 500 to 30 nm;
viscosity of the emulsion polymer at 10 rpm is less than 150 cP; and
when the emulsion polymer is applied to a seed surface, the resulting seed exhibits at least two of:
a higher average growth stage within a 6-day incubation period of at least 225% up to 625% compared to an untreated seed surface,
an increased water uptake compared to an untreated seed surface and
a reduction in dust given off of at least 25% up to 40% compared to an untreated seed surface.

2. The emulsion polymer system according to claim 1, wherein the stabiliser polymer has a $T_g$ in the range from 50° C. to 160° C.

3. The emulsion polymer system according to claim 1, wherein the stabiliser polymer is a styrene (meth)acrylic acid copolymer.

4. The emulsion polymer system according to claim 1, wherein the stabiliser polymer is in the form of a sodium or potassium salt.

5. The emulsion polymer system according to claim 1, wherein the core polymer has a $T_g$ in the range from –70° C. to 0° C.

6. A method of preparing the emulsion polymer system for agrochemical use according to claim 1, said method comprising mixing:
a stabiliser polymer comprising monomers of a vinyl aromatic and acrylic acid or a vinyl aromatic and methacrylic acid having a weight/number ratio of 15-40:85-60, respectively, a $T_g$ in the range from 30° C. to 300° C., and a molecular weight of 6,500 to 10,000; and
monomers of a vinyl aromatic and an alkyl ester of acrylic acid or an alkyl acrylic acid and having a $T_g$ in the range from –100° C. to 10° C. for forming the core polymer, wherein:
the emulsion polymer has a solids content of 30 to 70% and a particle size distribution D(v,0.9)s value of 500 to 30 nm;
viscosity of the emulsion polymer at 10 rpm is less than 150 cP; and
when the emulsion polymer is applied to a seed surface, the resulting seed exhibits at least two of:
a higher average growth stage within a 6-day incubation period of at least 225% up to 625% compared to an untreated seed surface,
an increased water uptake compared to an untreated seed surface and
a reduction in dust given off of at least 25% up to 40% compared to an untreated seed surface.

7. The emulsion polymer system according to claim 1, further comprising at least one of an agrochemical active, micronutrient, dye, pigment, and/or bulk filler.

8. A diluted emulsion polymer system comprising the emulsion polymer system according to claim 1, and further comprising in the range from 0.0001 to 10 wt. % in total of the core-stabiliser copolymer.

9. A method of coating seeds comprising applying to seeds an agrochemical composition comprising an agrochemical compound or substance and the core-stabiliser copolymer as defined in claim 1.

10. A seed coated with the emulsion polymer system according to claim 1.

11. A method of treating vegetation, plants, and/or seeds, comprising applying to said vegetation, plants and/or seeds a coating formulation comprising the emulsion polymer system according to claim 7.

12. An emulsion polymer system for agrochemical use comprising a core-stabiliser copolymer, said copolymer comprising:

a stabiliser polymer comprising monomers of a vinyl aromatic and acrylic acid or a vinyl aromatic and methacrylic acid having a weight/number ratio of 15-40:85-60, respectively, a $T_g$ in the range from 30° C. to 300° C., and a molecular weight of 6,500 to 10,000; and a water insoluble core polymer comprising monomers of a vinyl aromatic and an alkyl ester of acrylic acid or an alkyl acrylic acid and having a $T_g$ in the range from −100° C. to 10° C.; and a different polymer, said polymer comprising acid based and hydrophobe monomers having a weight/number ratio of said acid to hydrophobe of 10-90:90-10, having a $T_g$ in the range from 30° C. to 300° C., and having a molecular weight of 2,000 to 25,000, wherein:

the emulsion polymer has a solids content of 30 to 70% and a particle size distribution D(v,0.9)s value of 500 to 30 nm;

viscosity of the emulsion polymer at 10 rpm is less than 150 cP; and when the emulsion polymer is applied to a seed surface, the resulting seed exhibits at least two of:

a higher average growth stage within a 6-day incubation period of at least 225% up to 625% compared to an untreated seed surface, an increased water uptake compared to an untreated seed surface and a reduction in dust given off of at least 25% up to 40% compared to an untreated seed surface.

13. The emulsion polymer system according to claim 1, wherein the core polymer does not comprise water soluble monomers.

14. The emulsion polymer system according to claim 12, wherein the core polymer does not comprise water soluble monomers.

15. The emulsion polymer system according to claim 1, wherein there is grafting between the stabiliser polymer and the water insoluble core polymer.

* * * * *